US012696211B2

(12) United States Patent
Zhao et al.

(10) Patent No.: US 12,696,211 B2
(45) Date of Patent: Jul. 28, 2026

(54) CONFIGURATION OF SWITCHING TIME FOR WIRELESS REPEATER

(71) Applicant: Sony Group Corporation, Tokyo (JP)

(72) Inventors: Kun Zhao, Malmö (SE); Fredrik Rusek, Eslöv (SE); Olof Zander, Södra Sandby (SE); Erik Lennart Bengtsson, Eslöv (SE); Jose Flordelis, Basingstoke (SE)

(73) Assignee: Sony Group Corporation, Tokyo (JP)

( * ) Notice: Subject to any disclaimer, the term of this patent is extended or adjusted under 35 U.S.C. 154(b) by 297 days.

(21) Appl. No.: 18/282,530

(22) PCT Filed: Feb. 14, 2022

(86) PCT No.: PCT/EP2022/053478
§ 371 (c)(1),
(2) Date: Sep. 17, 2023

(87) PCT Pub. No.: WO2022/207174
PCT Pub. Date: Oct. 6, 2022

(65) Prior Publication Data
US 2024/0155526 A1 May 9, 2024

(30) Foreign Application Priority Data

Mar. 31, 2021 (SE) .................................... 2150395-8

(51) Int. Cl.
*H04W 56/00* (2009.01)
*H04B 7/155* (2006.01)
*H04W 72/1268* (2023.01)

(52) U.S. Cl.
CPC .... *H04W 56/0045* (2013.01); *H04B 7/15528* (2013.01); *H04W 72/1268* (2013.01)

(58) Field of Classification Search
CPC .......... H04W 56/0045; H04W 72/1268; H04B 7/15528
See application file for complete search history.

(56) References Cited

U.S. PATENT DOCUMENTS

| | | | |
|---|---|---|---|
| 10,499,356 B2 | 12/2019 | Patel | |
| 2013/0058309 A1* | 3/2013 | Kuo | .................. H04W 56/0045 370/331 |

(Continued)

FOREIGN PATENT DOCUMENTS

| | | | | |
|---|---|---|---|---|
| CN | 110249568 A | * | 9/2019 | ............... H04L 1/18 |
| EP | 3105876 B1 | | 12/2016 | |

(Continued)

OTHER PUBLICATIONS

International Search Report and Written Opinion from corresponding International Application No. PCT/EP2022/053478, mailed on Jun. 8, 2022, 11 pages.

(Continued)

*Primary Examiner* — Jianye Wu
(74) *Attorney, Agent, or Firm* — Tucker Ellis LLP

(57) ABSTRACT

A method for use in a base station (121) arranged for radio communication with user equipment, UE, via a time division duplexing, TDD, repeater (300), the method comprising: determining base station configuration of: a first period (BS DL Tx) usable for downlink, DL, communication, a second period (BS UL Rx) usable for uplink, UL, communication, and a guard period (GP) between the first and second periods, and transmitting configuration information to the repeater 300, identifying a starting point (Tu) of a repeater UL slot (REP DL SLOT) having an offset to the second period, wherein said starting point (Tu) is dependent on timing advance (TA) applied by one or more UEs served by the base station.

15 Claims, 5 Drawing Sheets

(56)  References Cited

U.S. PATENT DOCUMENTS

2019/0357157 A1    11/2019  Sandgren
2020/0383075 A1*  12/2020  Ashworth ......... H04W 56/0005
2020/0403689 A1    12/2020  Rofougaran
2020/0412519 A1    12/2020  Krishnaswamy
2021/0051679 A1     2/2021  Abedini
2021/0058884 A1     2/2021  Liu

FOREIGN PATENT DOCUMENTS

KR      20110119691  A    11/2011
WO       2020033063  A1    2/2020
WO       2021050866  A1    3/2021

OTHER PUBLICATIONS

Office Action and Search Report from corresponding Swedish
Application No. 2150395-8, mailed on Dec. 14, 2021, 11 pages.
MediaTek Inc., "General views on NR repeater," 3GPP TSG-RAN
WG4 Meeting #98e, R4-2101156, Jan. 25-Feb. 5, 2021, 4 pages.
Moderator (Qualcomm), "Email discussion summary for [98] [312]
NR_Repeater_General," 3GPP TSG-RAN WG4 Meeting #98-e,
R4-2103751, Jan. 25-Feb. 5, 2021, 36 pages.

* cited by examiner

USER PLANE                                    CONTROL PLANE

801. DETERMINE BASE STATION CONFIGURATION

802. OBTAIN INFORMATION OF ABSOLUTE TIMING ADVANCE

803. TRANSMIT CONFIGURATION TO REPEATER, IDENTIFYING STARTING POINT OF REPEATER UL SLOT DEPENDENT ON TA

804. RECEIVE UL SIGNAL FROM UE

805. DETERMINE TIMING OF SIGNAL RECEPTION OF PATH THROUGH REPEATER

806. TRANSMIT TA COMMAND TO UE BASED ON DETERMINED TIMING

CONFIGURATION OF SWITCHING TIME FOR WIRELESS REPEATER

TECHNICAL FIELD

This disclosure relates generally to the configuration of a repeater which operates in time division duplex to relay communication between different radio stations, such as a base station and a wireless device. Specifically, solutions are proposed to determine a switching time of the repeater, to execute a change of communication direction through the repeater.

BACKGROUND

Various systems for wireless communication have been released and defined in specifications provided within the 3rd Generation Partnership Project (3GPP). In such systems, wireless devices, herein referred to as User Equipment (UE), may be served by a wireless network through a radio access network including access nodes for radio communication with UEs. Such access nodes are herein referred to as base stations.

In various types of wireless networks, a so-called repeater may be employed to extend coverage between two radio stations. A repeater is a degenerative type of device, which does not decode data packages but simply "amplifies-and-forwards" signals. Recently, discussions have been raised to implement and specify the operation of a time division duplexing (TDD) repeater in 5G new radio (NR). Such a repeater has a comparatively simple structure, both regarding hardware implementation and the protocol stack, as indicated in FIG. 1, which shows an example of a possible protocol stack for NR repeaters, with the following layers and sublayers indicated between an NR base station, termed gNB, and a UE: RRC (Radio Resource Control), Packet Data Convergence Protocol (PDCP), Radio Link Control (RLC), Medium Access Control (MAC), Physical Layer (PHY) and Radio Frequency (RF).

Since the repeater does not decode a data package it receives, it creates difficulty for a TDD repeater to sync with the base station in the time domain. Information like a TDD UL/DL (Uplink/Downlink) pattern needs to be communicated to the repeater at least, and for this purpose a TDD repeater may synchronize to the base station to obtain configuration of the TDD DL-UL pattern.

However, the base station configuration of the UL/DL pattern may still not be sufficient to enable practical TDD operation since the UL transmission time of the devices may be adjusted by the base station, i.e., via so-called timing advance (TA) commands, while this information is blind to the repeater as it is UE specific information. Since different UEs have different UL transmission starting times adjusted by base station TA commands, it is not guaranteed that the UL signals from different UEs will arrive at the same time at the repeater side. On the other hand, since the repeater is synchronized with the DL timing of base station, the repeater also needs to start listening to the potential UL signals, from UEs, with sufficient timing advance. This is schematically illustrated in the drawing of FIG. 2. The repeater needs to establish its own REP UL TA, which determines when UL operation shall commence, so as to ensure that signals relayed in the UL are timely received by the base station in the base station UL reception period (BS UL Rx). However, the TAs employed at UEs may lead to misalignment of UL packets from the UE and the UL operation period (REP UL SLOT) in which the repeater receives (Rx) from UEs and transmits (Tx) to the base station (Rx→Tx). In FIG. 2 this is indicated for cases where packets from one UE may arrive at the repeater a bit later than the packets from another UE, this increases the needed UL duration period of the repeater.

Solutions are therefore needed to control how the repeater determines its starting time and duration for UL operation to listen for UL signals.

SUMMARY

The present disclosure provides solutions for use in radio communication between radio stations via a TDD repeater. The solutions proposed herein are set out in the independent claims, whereas various examples associated with the proposed solution are presented in the dependent claims.

According to one aspect, a method is proposed for use in a base station arranged for radio communication with user equipment, UE, via a time division duplexing, TDD, repeater, the method comprising:

determining base station configuration of:
 a first period usable for downlink, DL, communication,
 a second period usable for uplink, UL, communication, and
 a guard period between the first and second periods, and
transmitting configuration information to the repeater, identifying a starting point of a repeater UL slot having an offset to the second period, wherein said starting point is dependent on timing advance applied by one or more UEs served by the base station.

By configuring the starting point of the repeater UL slot dependent on TA of one or more of the UEs served by the base station 121, the risk of misalignment of signal reception of UL signals in the repeater 300 and the repeater UL slot is minimized.

BRIEF DESCRIPTION OF THE DRAWINGS

The proposed solution is described in more detail below with reference to the accompanying drawings, in which various examples of realizing the solutions are outlined.

DETAILED DESCRIPTION

Figure 1:
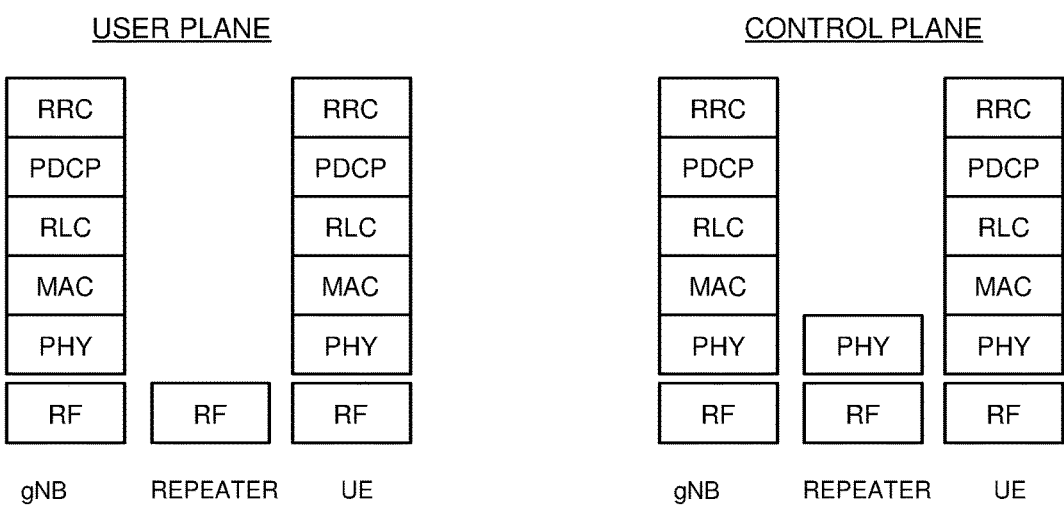
FIG. 1 indicates an example of a possible protocol stack for NR TDD repeaters.

In the following description, for purposes of explanation and not limitation, details are set forth herein related to various examples. However, it will be apparent to those skilled in the art that the present disclosure may be practiced in other examples that depart from these specific details. In some instances, detailed descriptions of well-known devices, circuits, and methods are omitted so as not to obscure the description of the present disclosure with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Figure 3:
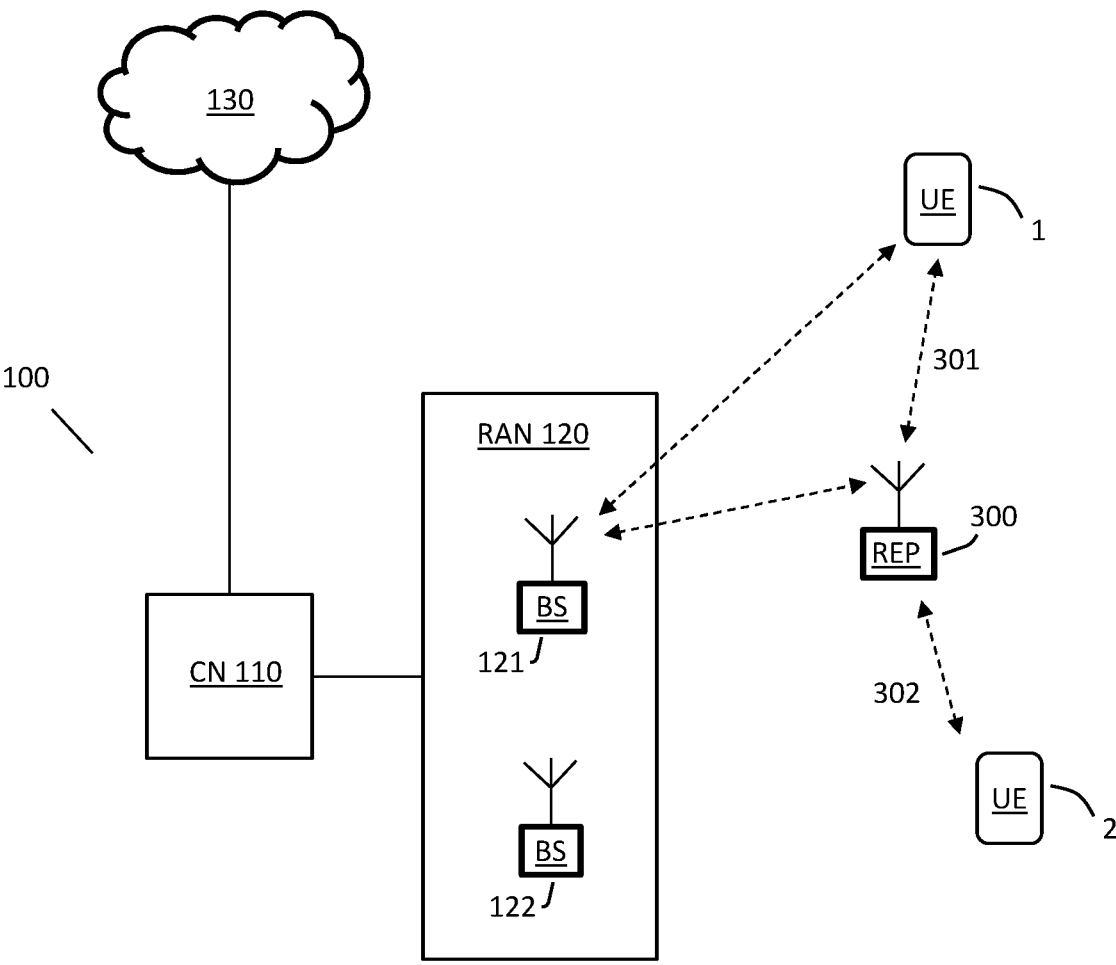
FIG. 3 schematically illustrates a wireless network according to some examples, in which the proposed solutions may be set out.

FIG. 3 schematically illustrates a wireless communication scenario, providing an example of a scene in which the solutions provided herein may be incorporated. The wireless communication system includes a wireless network 100, and one or more UEs 1, 2 (or wireless devices), which are configured to wirelessly communicate with the wireless network 100. The wireless network 100 comprises a core network 110, which is connected to other communication networks 130. The wireless network 100 further comprises one or more access networks 120, such as a 5G NR access network, usable for communication with UEs of the system. The access network 120 may comprise a plurality of access nodes or base stations 121, 122, configured to provide a wireless interface for, inter alia, the UE 1. For an NR implementation, the base station may be referred to as a gNB. Each base station comprises a point of transmission and reception, referred to as a Transmission and Reception Point (TRP), which coincides with an antenna of the respective base station. Logic for operating the base station may be configured at the TRP or at another physical location.

The UEs 1, 2 may be of any device type operable to wirelessly communicate with the network 100 through the base stations 121, 122, such as a mobile telephone, computer, tablet, a machine to machine (M2M) device, an IoT (Internet of Things) device or other.

The wireless network 100 further employs a TDD repeater 300, configured to relay communication signals, such as control signals and data packets, between various radio stations in the system. Particularly, the repeater 300 may be configured to convey UL signals from the UE 1 to the base station 121, and DL signals from the base station 121 to the UE 1.

Before discussing various process solutions for the proposed method, the base station 121, the repeater 300, and the UE 1 will be functionally discussed on a general level.

Figure 4:
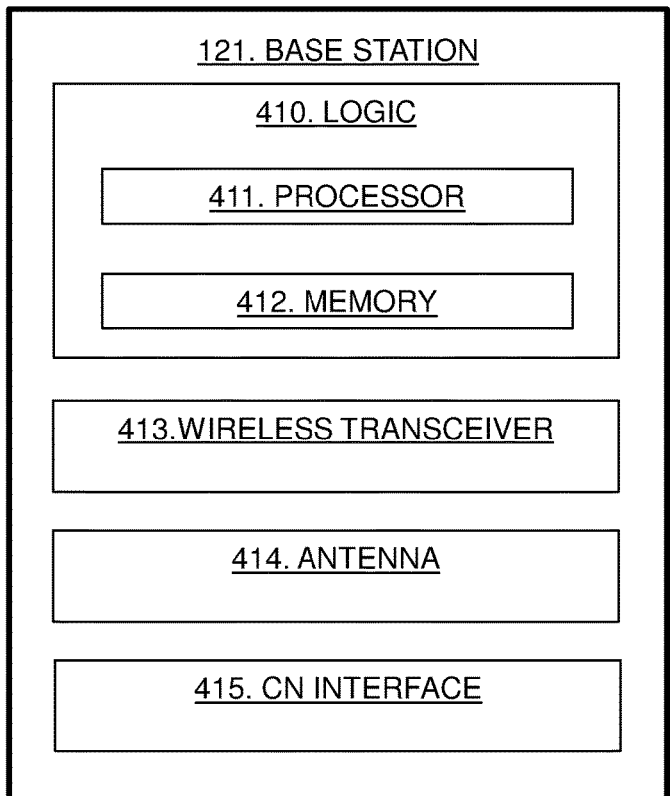
FIG. 4 schematically illustrates a base station configured to operate in accordance with the examples laid out herein.

FIG. 4 schematically illustrates an example of a base station 121, such as an NR gNB. The base station 121 comprises logic 410 configured to control wireless communication with UEs, and communication with the core network 110. The logic 410 may include a processing device 411, including one or multiple processors, microprocessors, data processors, co-processors, and/or some other type of component that interprets and/or executes instructions and/ or data. The processing device 411 may be implemented as hardware (e.g., a microprocessor, etc.) or a combination of hardware and software (e.g., a system-on-chip (SoC), an application-specific integrated circuit (ASIC), etc.). The processing device 411 may be configured to perform one or multiple operations based on an operating system and/or various applications or programs.

The logic 410 may further include memory storage 412, which may include one or multiple memories and/or one or multiple other types of storage mediums. For example, the memory storage 412 may include a random access memory (RAM), a dynamic random access memory (DRAM), a cache, a read only memory (ROM), a programmable read only memory (PROM), flash memory, and/or some other type of memory. The memory storage 412 may include a hard disk (e.g., a magnetic disk, an optical disk, a magneto-optic disk, a solid state disk, etc.). The memory storage 412 is configured for holding computer program code, which may be executed by the processing device 411, wherein the logic 410 is configured to control the base station 121 to carry out any of the method steps as provided herein. Software defined by said computer program code may include an application or a program that provides a function and/or a process. The software may include device firmware, an operating system (OS), or a variety of applications that may execute in the logic 410.

The base station further comprises a radio transceiver 413 for communicating radio signals with UEs and the repeater 300 in various frequency bands. The transceiver 413 may thus include a radio receiver and transmitter for communicating through at least an air interface.

The base station 121 may further comprise, or alternatively be connected to, an antenna system 414, which may include one or more antenna arrays. The antenna system 414 is operable by means of the transceiver 413 to communicate with UEs.

In various examples, the base station may be arranged to transmit in a plurality of beams, e.g. in a mm wave part of the frequency spectrum, e.g. in Frequency Range (FR) 2. In such examples, different spatial configuration may be arranged for different beams transmitted by the antenna system 414.

The base station 121 further comprises a communication interface 415 for connection to the other nodes of the wireless network 100, such as the core network (CN) 110.

The base station 121 may comprise further elements, such as casing and power supply, which have been left out of the drawing for the sake of simplicity.

Figures 5, 6:
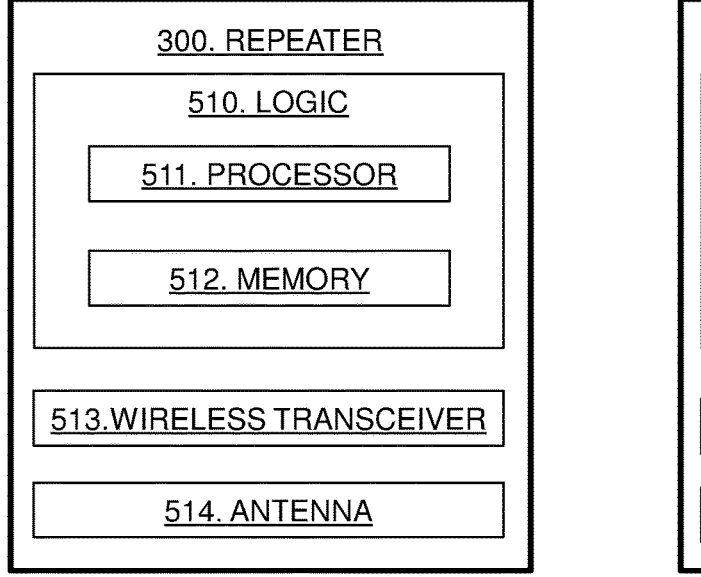
FIG. 5 schematically illustrates a TDD repeater configured to operate in accordance with the examples laid out herein.
FIG. 6 schematically illustrates a UE configured to operate in accordance with the examples laid out herein.

FIG. 5 schematically illustrates an example of a TDD repeater 300, such as an NR gNB. The repeater 300 comprises logic 510 configured to control operation of the repeater, such as to receive a radio signal from a first radio station and transmit the radio signal to a second radio station, and to switch direction of relaying signals between such radio stations according to a TDD schedule. The logic 510 may include a processing device 511, including one or multiple processors, microprocessors, data processors, co-processors, and/or some other type of component that interprets and/or executes instructions and/or data. The processing device 511 may be implemented as hardware (e.g., a microprocessor, etc.) or a combination of hardware and software (e.g., a system-on-chip (SoC), an application-specific integrated circuit (ASIC), etc.). The processing device 511 may be configured to perform one or multiple operations based on an operating system and/or various applications or programs.

The logic 510 may further include memory storage 512, which may include one or multiple memories and/or one or multiple other types of storage mediums. For example, the memory storage 512 may include a random access memory (RAM), a dynamic random access memory (DRAM), a cache, a read only memory (ROM), a programmable read only memory (PROM), flash memory, and/or some other type of memory. The memory storage 512 may include a hard disk (e.g., a magnetic disk, an optical disk, a magneto-optic disk, a solid state disk, etc.). The memory storage 512 is configured for holding computer program code, which may be executed by the processing device 511, wherein the logic 510 is configured to control the repeater 300 to carry out any of the method steps as provided herein. Software defined by said computer program code may include an application or a program that provides a function and/or a process. The software may include device firmware, an operating system (OS), or a variety of applications that may execute in the logic 510.

The repeater 300 further comprises a radio transceiver 513 for communicating radio signals with UEs and base stations in various frequency bands and various communication modes. The transceiver 513 may thus include a radio receiver and transmitter for communicating through at least an air interface.

The repeater 300 may further comprise, or alternatively be connected to, an antenna system 514, which may include one or more antenna arrays. The antenna system 514 is operable by means of the transceiver 513 to communicate with radio stations.

The repeater 300 may comprise further elements, such as casing and power supply, which have been left out of the drawing for the sake of simplicity.

FIG. 6 schematically illustrates an example of a radio station in the form of a UE 1 for use in a wireless network 100 as presented herein.

The UE 1 comprises a radio transceiver 613 for communicating with other entities of the radio communication network 100, such as the base stations 121, 122 in various frequency bands. The transceiver 613 may thus include a radio receiver and transmitter for communicating through at least an air interface.

The UE 1 further comprises logic 610 configured to communicate data, via the radio transceiver 613, on a radio channel, to at least the wireless communication network 100.

The logic 610 may include a processing device 611, including one or multiple processors, microprocessors, data processors, co-processors, and/or some other type of component that interprets and/or executes instructions and/or data. The processing device 611 may be implemented as hardware (e.g., a microprocessor, etc.) or a combination of hardware and software (e.g., a system-on-chip (SoC), an application-specific integrated circuit (ASIC), etc.). The processing device 611 may be configured to perform one or multiple operations based on an operating system and/or various applications or programs.

The logic 610 may further include memory storage 612, which may include one or multiple memories and/or one or multiple other types of storage media. For example, the memory storage 612 may include a random access memory (RAM), a dynamic random access memory (DRAM), a cache, a read only memory (ROM), a programmable read only memory (PROM), flash memory, and/or some other type of memory. The memory storage 612 may include a hard disk (e.g., a magnetic disk, an optical disk, a magneto-optic disk, a solid state disk, etc.). The memory storage 612 is configured for holding computer program code, which may be executed by the processing device 611, wherein the logic 610 is configured to control the UE 1 to carry out any of the method steps as provided herein. Software defined by said computer program code may include an application or a program that provides a function and/or a process. The software may include device firmware, an operating system (OS), or a variety of applications that may execute in the logic 610.

The UE 1 may further comprise an antenna system 614, which may include one or more antenna arrays. In various examples the antenna system 614 comprises different antenna elements configured to communicate with the wireless network 100.

Obviously, the UE 1 may include other features and elements than those shown in the drawing or described herein, such as a power supply, a casing, a user interface, sensors, etc., but these are left out for the sake of simplicity.

Going forward, the proposed solution will primarily be discussed with regard to communication between the access node 121 and the UE 1 over the repeater 300. However, it should be noted that the proposed solutions are in various examples also applicable to communication between two radio stations 1, 2 via the repeater 300, where those radio stations are both UEs 1, 2.

In the current discussion in 3GPP regarding operation of a TDD repeater 300, the inventors note that the timing issue for the TDD repeater needs to be resolved. As an underlying assumption, the repeater 300 is assumed to be able to know the TDD DL/UL pattern. Still, it is unclear when and how the repeater would switch from the DL direction to the UL direction, especially considering the UE 1 may transmit ahead of the UL symbol due to the time advance (TA) adjustment by the base station 121. Multiple solutions are proposed herein to resolve this issue.

The solutions outlined herein are based on the notion that the base station 121 provides configuration for the repeater and/or the UE such that a starting point of an UL slot used in the repeater 300 precedes reception in the repeater 300 of an UL signal from the UE 1.

Figure 2:
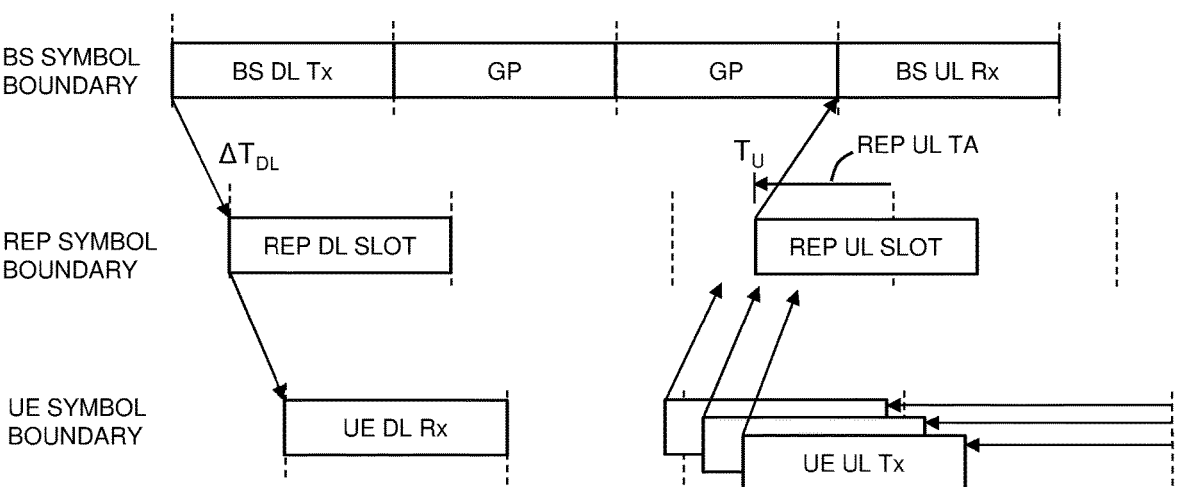
FIG. 2 illustrates challenges in how a TDD repeater determines when to start listening to UL signals.

According to a general formulation of the proposed solution, a method is provided for use in the base station 121 arranged for radio communication with the UE 1 via the TDD repeater 300. Reference is here made to the terms used in FIG. 2, for ease of understanding, but it shall be noted that these terms are exemplary.

The proposed solution is applied in the context that the repeater 300 is configured by the base station 121. This may entail the base station 121 transmitting configuration information to the repeater, such that the repeater 300 is configured with at least one DL slot (REP DL SLOT) in which the repeater is to receive from the base station 121 and transmit to UEs (Rx→Tx), and at least one UL slot (REP UL SLOT) in which the repeater 300 is to receive from UEs and transmit to the base station 121 (Rx→Tx). This configuration information may be broadcast information, transmitted to more than one wireless node. In various examples, both the base station 121 and the repeater 300 are stationary, i.e. that a fixed distance between the two is obtained. Properties in the environment may nevertheless change, e.g. so that the direct path between the base station 121 and the repeater 300 is blocked, and in such a scenario the radio distance, with regard to signal propagation, is not fixed. In some examples, one or both of the base station 121 and the repeater 300 are mobile, and also in such a scenario the radio distance may change. For these reasons, the configuration may need to be updated, e.g. regularly or based on detected mobility. What is needed is that the channel remains constant. In all cases, the configuration therefore needs to be monitored and sometimes updated. For the sake of simplicity, implications of updating of the configuration and/or change of the radio distance will not be discussed further herein.

A starting point of the DL slot (REP DL SLOT) of the repeater is configured with an offset $\Delta T_{DL}$, which is based on the signaling/propagation distance between the base station 121 and the repeater 300, and allows for DL signaling from the base station 121 to be timely received in the repeater 300. Moreover, the UL slot (REP UL SLOT) of the repeater 300 is configured with an offset (REP UL TA) defining a starting point $T_U$ of UL operation for the repeater 300, so that any UL signals relayed through the repeater 300 are transmitted early enough to be timely received in a period (BS UL Rx) allocated for signal reception in the base station 121. The UL slot of the repeater 300 is thus configured with a negative offset (earlier in time) having an absolute value which is typically at least as large as the offset $\Delta T_{DL}$ applied to the DL slot.

UEs served by the base station 121 will apply TAs such that signals transmitted by such UEs are timely received in the period (BS UL Rx) allocated for signal reception in the base station 121. The TA is regulated by TA commands sent by the base station 121. If all signaling between the base station 121 and a UE passes through the repeater 300 it can be assumed that the TA is set based on that signaling path and that reception in the repeater 300 of UL transmission from all such UE will be aligned in time. However, there are still problems that need to be considered and catered for.

Figure 7A:
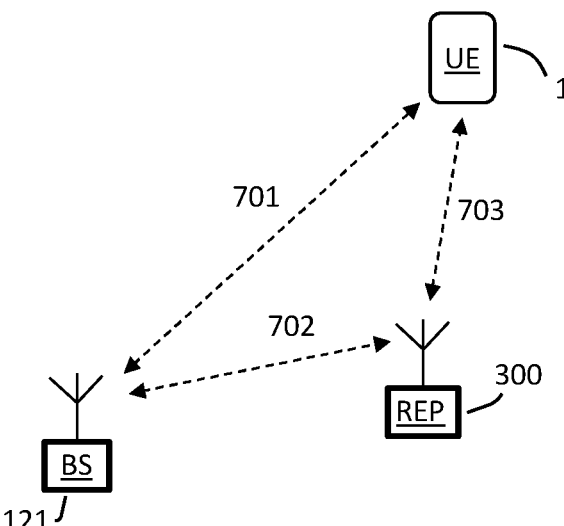
FIGS. 7A and 7B schematically illustrate examples of repeater operation dependent on range to two radio stations communicating through the repeater.
Figure 7B:
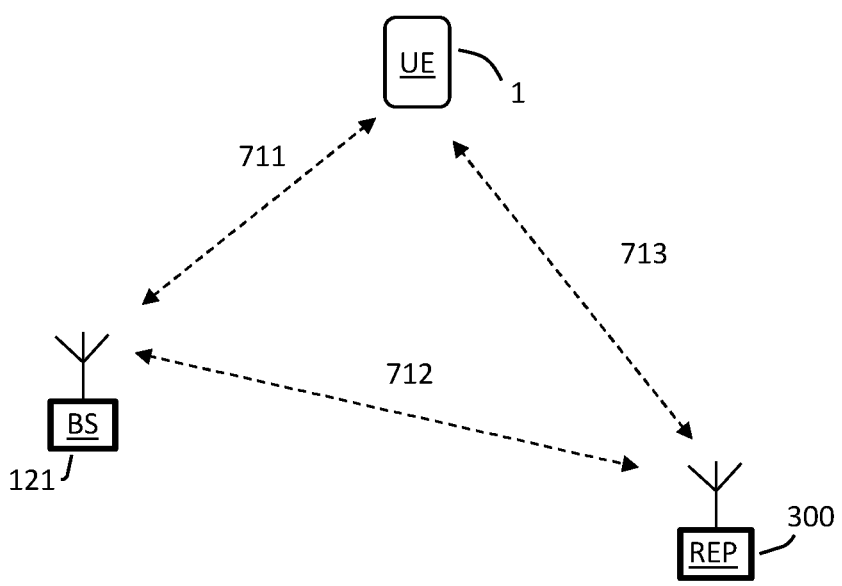

FIGS. 7A and 7B indicate signal propagation between the UE 1, the base station 121, and the repeater 300, where the length of the arrows 701, 702, 703 are proportional to the radio distance, or signal propagation time, between the respective devices. In prior art configuration, a repeater TA is to set proportional to the propagation delay of paths 702, 712, respectively.

With reference to FIG. 7A, it may be noted that a UE 1 is configured with TA by the base station 121 based on all received signals from that UE 1. If the base station 121 detects additional paths, such as both signals 701 and 702, 703, TA may be configured based on the shortest path 701.

In that case, it may be realized that UL transmission from all UEs need not align in time at the repeater 300, and may e.g. lead to an UL signal from a UE arriving "too early" at the repeater, i.e. before a switching point to UL in the repeater 300. In such a case, a first part of that UL transmission will be missed by the repeater 300 and not repeated to the base station 121. Alternatively, and dependent on the relative position of the base station 121, the repeater 300 and the UE1, e.g. as indicated in FIG. 7B, signaling may arrive "too late" in the repeater 300, such that the repeater 300 is configured to switch to DL operation before all signaling is received from the UE 1.

Based on at least the aforementioned problems of configuring the repeater 300, a method is hereby proposed for use by the base station 121 which comprises:

determining base station configuration of:
a first period (BS DL Tx) usable for downlink, DL, communication,
a second period (BS UL Rx) usable for uplink, UL, communication, and
a guard period (GP) between the first and second periods, and
transmitting configuration information to the repeater 300, identifying a starting point ($T_U$) of a repeater UL slot (REP UL SLOT) having an offset (REP UL TA) to the second period, wherein said starting point ($T_U$) is dependent on timing advance (TA) applied by one or more UEs served by the base station.

From the perspective of the repeater, a method is proposed for use by the repeater 300 which comprises:

synchronizing with the base station 121 to obtain base station configuration of
a first period (BS DL Tx) usable for downlink, DL, communication,
a second period (BS UL Rx) usable for uplink, UL, communication, and
a guard period (GP) between the first and second periods; and
receiving configuration information from the base station 121, identifying a starting point of a repeater UL slot having an offset to the second period, wherein said starting point is dependent on timing advance applied by one or more UEs served by the base station.

By configuring the starting point of the repeater UL slot dependent on TA of one or more of the UEs served by the base station 121, the risk of misalignment of signal reception of UL signals in the repeater 300 and the repeater UL slot is minimized.

In one example, the base station 121 configures the repeater 300 to switch from DL direction to UL during at an identified position in the GP. The identified position may in some examples be a pre-defined position, such as a special symbol, a.k.a. guard symbol.

In one example, the base station 121 configures the repeater to set the starting point $T_U$ in the middle of the GP. In this case, the base station 121 needs to configure a proper length of the GP not only by the cell size, i.e. based on DL propagation delay to the repeater, $\Delta T_{DL}$, but also to avoid that the first UL transmission will not arrive at the repeater 300 before the switching point.

In some examples, starting point $T_U$ is configured by identification of an absolute offset value, defining a time delay/advance after or before the DL or UL slot, e.g., 5 ms after the DL slot REP DL SLOT.

In some examples, the starting point $T_U$ is configured with respect to an identified symbol or slot in the GP. The base station 121 may further be arranged to insert an additional guard period/slot/symbol, e.g. after the identified GP.

In some examples, the repeater 300 is configured according to predefined switching time, e.g. with a relation to the GP provided by technical specification. It may e.g. be predefined that the repeater 300 always switches in the middle of the GP. Such an example may involve the configuration information identifying a starting point of a repeater UL slot having an offset to the second period according to a predefined value, e.g. such that said starting point is defined with respect to the guard period between the first and second periods.

It shall thus be understood that the configuration information provided by the base station 121 need not specify the starting point, or the offset, but rather that said indication provides for the repeater 300 to determine where the starting point shall be.

Similarly, in some scenarios or examples, e.g. indoor to outdoor communication, the UL signals may enter the repeater 300 with a greater delay than the direct signal from the UE to the base station, as is indicated in FIG. 7B. The UL window of the repeater may then miss the last part of the signal. A measure to avoid this, is to configure the repeater 300 with a second TA (TA2) which extends the UL window at the back end. Such configuration may be combined with an additional guard symbol (GS2) inserted between the UL to DL switch occasions. The GS2 may be configured at least to UEs which experience such delay profile, e.g. assuming multiple UEs are communicating over the repeater. In further scenarios a GS2 is configured to UEs without the use of TA2 at the repeater.

The base station 121 may in some examples configure the repeater 300 for UL operation only. In further implementations some repeaters 300 are designed for UL operation only. Such situations, or repeaters, relate to scenarios where the links between UEs and the base station 121 are UL limited (which is often the case based on UE transmit power limitations). Similarly, as with UL and DL enhancing repeaters, UL only operation assumes that the DL signals are not amplified, i.e. that the repeater is idle during DL, and therefore needs to be synchronized with appropriate TA and optionally TA2.

In some examples, the method comprises obtaining information of absolute TA values applied by UEs served by the base station, wherein the starting point $T_U$ is configured to accommodate for at least one of said absolute TA values.

As the base station 121 may only have relative TA information for the UEs, referring to a previous UL transmission, but not the absolute value referring to the UL symbol, the base station may need to determine the absolute value. In some examples, this may be obtained by accumulating a TA value at the base station, based on provided TA commands, to obtain the absolute value. In some examples, this may further comprise determining the absolute TA value based on an obtained location of the UE, either received from the UE or determined in a location server by RAT-dependent positioning. In some examples, obtaining the absolute TA value may comprise receiving, at least once, an indication in the base station 121 of the absolute TA value in a TA value report by the UE.

In some examples, the starting point $T_U$ is configured by the base station, based on the absolute TA value(s). Alternatively, the base station 121 may be arranged to transmit an indication of at least one of said absolute TA values, for receipt in the repeater 300, to control the repeater to adjust said starting point $T_U$. The transmitted indication may provide a TA command for the repeater 300 to apply, or of an absolute TA value to accommodate for, wherein the repeater is configured to change the starting point $T_U$ accordingly.

In some examples, the configuration information identifies the starting point $T_U$ dependent on TA applied by one or more UEs which are scheduled, by the base station 121, to transmit. This way, the starting point $T_U$ may be set dependent on more relevant information, rather than any served UE.

An even more flexible example may be required, based on the notion that it may be difficult to foresee which UE would transmit in the UL through the repeater 300. It may therefore create unnecessary overhead for the base station 121 to communicate such UE-related information to the repeater 300. Instead, to make sure the repeater 300 can prepare to receive in the UL advanced enough, the base station 121 is arranged to configure the starting point $T_U$ for the repeater 300 dependent on the largest TA value applied by any of the UEs served by the base station 121. The UEs served by the base station 121 may be defined as all UEs in connected mode with respect to the base station 121.

In some examples, where TA information is transmitted, this is carried out by the base station 121 over the physical layer, for receipt in the repeater 300, such as by broadcasting the TA information over physical layer signaling. As noted, the TA information may be indicative of the largest TA in the cell. Current TA commands are transmitted over MAC layer to each UE, but transmitting over the physical signaling layer provides the benefit of maintaining a reduced protocol stack (as shown in FIG. 1) for the repeater 300.

One potential downside of configuring the starting point $T_U$ for the repeater 300 dependent on the largest absolute TA value applied by any of the UEs served by the base station 121 is that it may lead to a too large TA adjustment (setting of a too large offset) for the repeater 300, since the UE with the largest absolute TA may not go through the repeater 300. However, based on the notion that the relative position of the repeater 300 with respect to the base station 121, the repeater 300 will be served through the same base station beam(s) all the time, in a scenario where multi-beam operation is employed by the base station 121. In this example, the base station 121 is thus arranged to configure the starting point $T_U$ for the repeater 300 dependent on the largest absolute TA value applied by the UEs served in a base station beam relayed through the repeater 300.

In various examples, the configuration information transmitted from the base station 121 to the repeater 300 identifies a first offset parameter based on signal propagation distance between the base station and the repeater, i.e. corresponding to or based on $\Delta T_{DL}$. The first offset parameter may provide a delay of the repeater DL slot (REP DL SLOT) with respect to the DL period (BS DL Tx) of the base station 121. The configuration information may further comprise a second offset parameter specifically related to said starting point, which is dependent on TA, and which may be configured and identified in accordance with the examples outlined herein.

Another problem that might arise in the context of operation of the TDD repeater 300 is that an UL signal arrives at the repeater 300 with a larger delay than to the base station 121. This may e.g. be the case in a scenario as illustrated in FIG. 7A and particularly 7B, where the base station 121 detects signals 701, 711 received directly from the UE 1. The result may then be that the base station provides TA commands to the UE 1 with the aim to align transmission timing of the UE 1 such that those direct signals 701, 711 align with the period BS UL Rx usable for uplink at the base station 121. This may be the result when the base station 121 determines TA adjustment for a UE based on a first tap, representing the first received signal in multi-path reception. The consequence, for UL transmission through the repeater 300, may be that the last UL symbol is cut off by the repeater 300, as the repeater switches to DL operation before the full UL signal is received from the UE 1.

In one example, this problem is overcome by analyzing an UL signal received from a served UE 1 to determine path association, and configuring the UE 1 with TA commands dependent on the determined path association. This may include:

receiving the UL signal from the UE 1;

determining, responsive to detecting that the signal is received over two or more paths, timing of signal reception of a path through the repeater 300; and transmitting a TA command to the UE 1 based on the determined timing.

This is thus obtained by the base station 121 being arranged to transparently align the UE 1 TA (configured by the base station 121) to avoid symbol cutoff, by setting a larger TA for the UE 1. In some examples this may be accomplished by tap detection of the received UL signal, wherein the base station 121 is configured to use the strongest tap to determine TA adjustment for the UE 1. So, for a UE 1 closer to the base station 121 (shorter delay) than it is to the repeater 300, as in FIG. 7B, still being served through the repeater 300, the base station 121 is arranged to configure the UE 1 with a TA based on the signal from the repeater 300 (assumed stronger).

Figure 8:
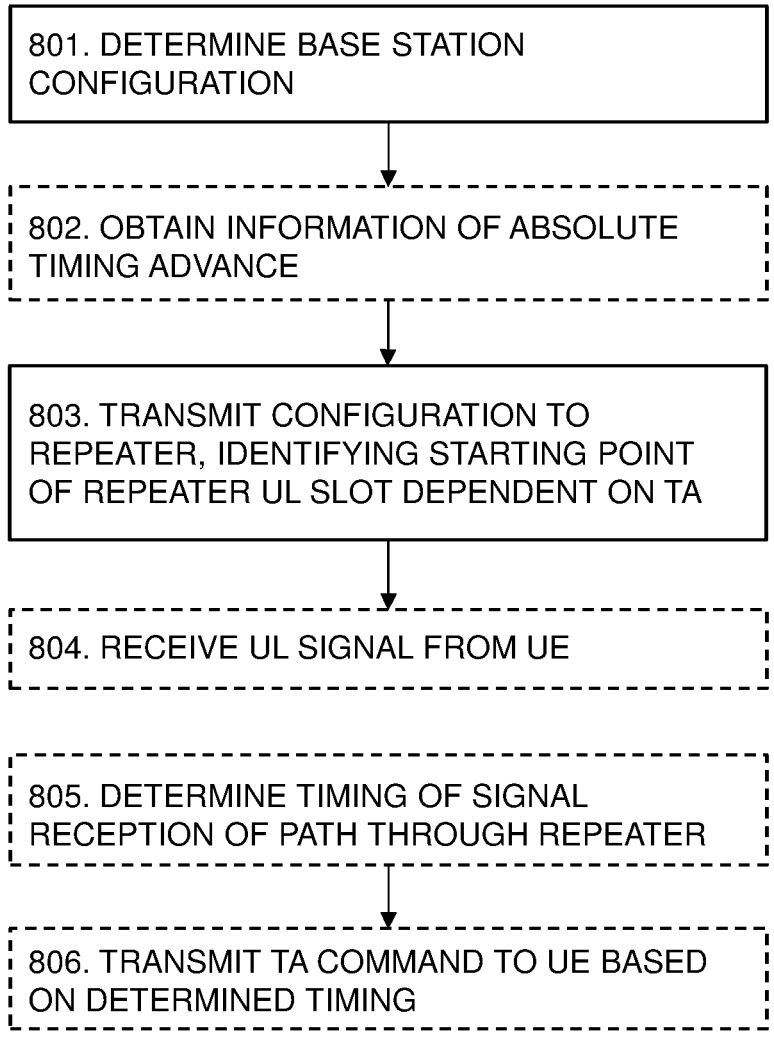
FIG. 8 is a flow chart of a method carried out in a base station according to various aspects associated with the proposed solution.

FIG. 8 shows a flowchart of various method steps provided by the proposed method, as carried out by the base station 121 for radio communication with UEs via the TDD repeater 300. The method comprises:

determining (801) base station configuration of:

a first period usable for downlink, DL, communication, a second period usable for uplink, UL, communication, and a guard period between the first and second periods.

In step 802, the base station may obtain information of absolute TA values, such as a largest TA value applied by UE served through the repeater.

In step 803, the base station 121 transmits configuration information to the repeater, identifying a starting point of a repeater UL slot having an offset to the second period, wherein said starting point is dependent on timing advance applied by one or more UEs served by the base station.

The method may further comprise:

receiving 804 an UL signal from the UE 1;

determining 805, responsive to detecting that the signal is received over two or more paths, timing of signal reception of a path through the repeater 300; and transmitting 806 a TA command to the UE 1 based on the determined timing.

The method as outlined in FIG. 8 may be further characterized in accordance with any of the examples laid out herein.

Various aspects of the proposed solution have been outlined in the foregoing. Except for where they are clearly contradictory, these examples may be combined in any way.

The invention claimed is:

1. A method for use in a base station arranged for radio communication with user equipment (UE) via a time division duplexing (TDD) repeater, the method comprising:

determining base station configuration of:

a first period usable for downlink (DL) communication, a second period usable for uplink (UL) communication, and a guard period between the first and second periods;

obtaining information of absolute timing advance (TA) values applied by UEs served by the base station, wherein the absolute TA values are based on an obtained location of the UEs; and transmitting configuration information to the repeater, identifying a starting point of a repeater UL slot having an offset to the second period, wherein said starting point is dependent on the absolute TA values applied by the UEs, and wherein the starting point is configured to accommodate for at least one of the absolute TA values.

2. The method of claim 1, comprising: transmitting an indication of at least one of said absolute TA values, for receipt in the repeater, to control the repeater to adjust said starting point.

3. The method of claim 2, wherein said at least one of said absolute TA values is a largest TA value applied by said UEs.

4. The method of claim 2, wherein said at least one of said absolute TA values is a largest TA value applied by said UEs in a base station beam relayed through the repeater.

5. The method of claim 1, comprising:

receiving an UL signal from the UE;

determining, responsive to detecting that the signal is received over two or more paths, timing of signal reception of a path through the repeater; and transmitting a TA command to the UE based on the determined timing.

6. The method of claim 5, wherein the determining timing of signal reception comprises determining, out of a plurality of taps associated with said paths, the strongest tap of the detected UL signal.

7. The method of claim 1, wherein the configured starting point is identified with respect to a guard symbol of the guard period, a repeater DL slot, or the repeater UL slot.

8. The method of claim 1, wherein said configuration information identifies a first offset parameter based on signal propagation distance between the base station and the repeater, and a second offset parameter specifically related to said starting point.

9. A method for operating a time division duplex (TDD) repeater in radio communication between a base station and a user equipment (UE) the method comprising:

synchronizing with the base station to obtain base station configuration of a first period usable for downlink (DL) communication, a second period usable for uplink (UL) communication, and a guard period between the first and second periods;

receiving configuration information from the base station, identifying a starting point of a repeater UL slot having an offset to the second period, wherein said starting point is dependent on timing advance applied by UEs served by the base station, wherein the starting point is configured to accommodate for at least one absolute timing advance (TA) value used by the UEs served by the base station, and wherein the absolute TA values are based on an obtained location of the UEs.

10. The method of claim 9, comprising: receiving, from the base station, an indication of at least one of said absolute TA values; and adjusting said starting point based on said indication.

11. The method of claim 10, wherein said at least one of said absolute TA values is a largest TA value used by said UEs.

12. The method of claim 10, wherein said at least one of said absolute TA values is a largest TA value applied by said UEs in a base station beam relayed through the repeater.

13. The method of claim 9, wherein the configured starting point is identified with respect to a guard symbol of the guard period, a repeater DL slot, or the repeater UL slot.

14. The method of claim 9, wherein said configuration information identifies a first offset parameter based on signal propagation distance between the base station and the repeater, and a second offset parameter specifically related to said starting point.

15. A method for use in a base station arranged for radio communication with user equipment (UE) via a time division duplexing (TDD) repeater, the method comprising:

determining base station configuration of:

a first period usable for downlink (DL) communication, a second period usable for uplink (UL) communication, and a guard period between the first and second periods;

obtaining information of absolute timing advance (TA) values applied by UEs served by the base station, wherein the absolute TA values are based on an obtained location of the UEs; and transmitting configuration information to the repeater, identifying a starting point of a repeater UL slot having an offset to the second period, wherein said starting point is defined with respect to the guard period between the first and second periods and is dependent on the absolute TA values applied by the UEs, and wherein the starting point is configured to accommodate for at least one of said absolute TA values.

\* \* \* \* \*